United States Patent [19]

Oestreich

[11] Patent Number: 4,615,168

[45] Date of Patent: Oct. 7, 1986

[54] APPARATUS COMPRISING TWO CONCENTRICALLY DISPOSED TUBE STORES

[75] Inventor: Ulrich Oestreich, Munich, Fed. Rep. of Germany

[73] Assignee: Siemens Aktiengesellschaft, Munich, Fed. Rep. of Germany

[21] Appl. No.: 723,813

[22] Filed: Apr. 16, 1985

[30] Foreign Application Priority Data

Apr. 19, 1984 [DE] Fed. Rep. of Germany ....... 3414974

[51] Int. Cl.[4] .................... H01B 13/02; H01B 13/04; H01B 13/24; H01B 13/26

[52] U.S. Cl. .......................................... 57/7; 57/293; 57/294; 57/297; 57/342; 156/51; 156/166; 156/172; 156/433

[58] Field of Search .................. 57/293-297, 57/332, 341-346, 3, 6, 7; 156/47, 48, 51, 52, 148, 166, 169, 172, 173, 433, 441

[56] References Cited

U.S. PATENT DOCUMENTS

| 4,359,857 | 11/1982 | Oestreich | 57/293 X |
|---|---|---|---|
| 4,359,860 | 11/1982 | Schleese et al. | 57/294 X |
| 4,366,667 | 1/1983 | Oestreich | 57/7 |
| 4,386,496 | 6/1983 | Oestreich | 57/293 |
| 4,429,521 | 2/1984 | Oestreich | 57/294 |
| 4,432,199 | 2/1984 | Dzyck et al. | 57/294 |
| 4,434,610 | 3/1984 | Oestreich | 57/294 |
| 4,448,015 | 5/1984 | Usui | 57/3 |
| 4,458,476 | 7/1984 | Mayr et al. | 57/7 X |
| 4,467,596 | 8/1984 | Feese et al. | 57/293 |
| 4,528,810 | 7/1985 | Vogelsberg | 57/293 X |

FOREIGN PATENT DOCUMENTS 2615275  5/1979  Fed. Rep. of Germany .

Primary Examiner—John Petrakes
Attorney, Agent, or Firm—Hill, Van Santen, Steadman & Simpson

[57] ABSTRACT

An apparatus comprising two concentrically arranged tube stores, a device for passing a cable core through the inner tube of the concentrically arranged tube stores and a stranding nipple characterized by a device for applying adhesive to a web being spun onto the tube store so as to secure the spun covering thereon. Preferably, the spun covering is applied in an SZ stranding manner with the inner covering reversing directions of twist at a point different than the outer covering.

20 Claims, 1 Drawing Figure

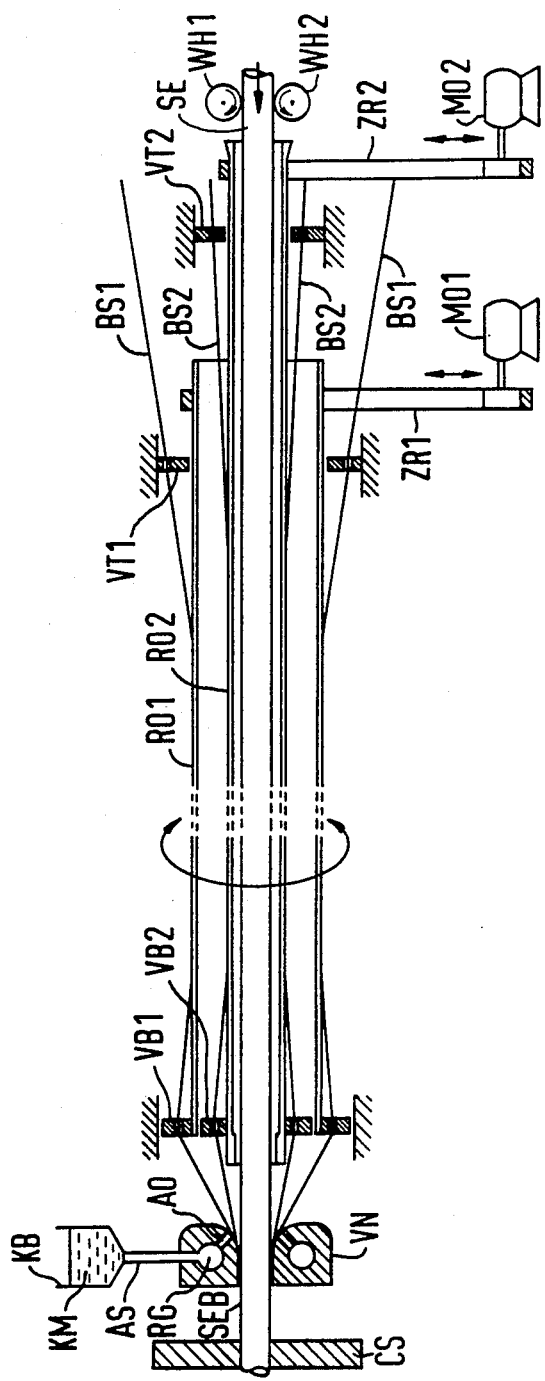

APPARATUS COMPRISING TWO CONCENTRICALLY DISPOSED TUBE STORES

BACKGROUND OF THE INVENTION

The present invention is directed to an apparatus having two tube stores which are disposed in a concentric relationship with each other, have a common stranding nipple and are operated with changing directions of rotation to produce changing directions of the lay.

An apparatus having two tube stores arranged concentric to each other with a common stranding nipple is known and disclosed in German AS No. 26 15 275. In this apparatus, electrical conductors are supplied and stranded into a bundle by both an outer tube store as well as by the inner concentrically disposed tube store.

It is desirable in many cases to apply a spun covering to a cable core and this cover usually takes the form of tensile threads preferably made of a synthetic plastic material. Problems will occur particularly in light waveguide cables because the sensitive glass fibers are to be protected against unallowed mechanical stresses. When such a spun covering is likewise applied with a changing direction of lay, in other words an SZ stranding or spinning, there is a problem in the fact that the reversing locations are not adequately fixed or secured. It is thereby possible that a tension load on the cable when applied at these locations of the spun covering will lead to an irreversible cable stretching. Although it is known that these difficulties can be countered by applying a retaining helix to the SZ covering or web, this nonetheless requires a considerable additional cost. Further, the manufacturing process must always be stopped at greater intervals for the application of the retaining helix.

SUMMARY OF THE INVENTION

The object of the present invention is to improve an apparatus having two concentrically arranged tube stores in such a fashion that the application of two-ply spun cover to a cable core is enabled in a simple fashion therewith. To achieve this, the present invention is directed to an improvement in an apparatus comprising two tube stores disposed concentric to one another with a common stranding nipple being positioned at an output side of the two stores and means for operating the two tube stores with a changing direction of rotation to create a changing direction of lay for each layer. The improvements are that the apparatus includes means for supplying web threads for absorbing longitudinal forces to each of the tube stores as a stranding stock, means for feeding an adhesive material for the web threads at a position adjacent the output of the tube stores and adjacent the stranding nipple and means for conducting the actual cable core through the inner tube store of the two concentric tube stores so that it may be provided with a spun covering at the output of the concentrically arranged tube stores.

Despite the application of a two-ply SZ stranding, an undoing of the reversing locations or even merely a lower tensile strength at these regions is avoided because adhesive material for the threads of the spun cover is applied at the output of the tube store. The adhesive material is thus applied at practically the same moment at which the threads of the spun cover are still individually accessible. It is therefore not necessary to process any web threads already moistened with the adhesive material which material would cause a corresponding complication in the processing event. The moistening of the web threads with the adhesive material is sufficiently strong according to the invention for both plies. When in the hardened condition, the material produces a high tensile strength and thus provides an effective protection of the cable core. On principle, the moistening with adhesive is only needed at the reversing locations.

In a particularly advantageous development of the invention, the feed of the adhesive material is undertaken in the region of the stranding nipple, for example, at the location at which the individual threads of the spun covering are still individually accessible for the last time.

Other features and advantages of the present invention are readily apparent from the following description and claims.

BRIEF DESCRIPTION OF THE DRAWING

The FIGURE is a schematic presentation of an apparatus with portions broken away for purposes of illustration in accordance with the present invention.

DESCRIPTION OF THE PREFERRED EMBODIMENTS

The principles of the present invention are particularly useful in a stranding apparatus illustrated in the drawing. The stranding apparatus will produce a two-ply SZ web or cover on a cable core SE. In order to accomplish this, the apparatus includes two tube stores RO1 and RO2 which are arranged concentric to one another. The tube store RO1 is an outer store, has a large diameter and telescopically receives the tube store RO2 which is a smaller inner tube store. Preferably, the diameter of the outer tube store RO1 should be so much larger than the diameter of the inner tube store RO2 that the inner tube store can be retracted for threading. The tube stores RO1 and RO2 are driven by separate drive devices in the form of stepping motors MO1 and MO2 which are arranged at an input end of each of the tube stores. The drive of the outer tube store RO1 is by a toothed belt ZR1 which engages a gear wheel applied to the outside of the tube store and extends to a pinion on the drive shaft of the motor MO1. In a similar manner, the motor MO2 has a pinion driving a toothed belt ZR2 that engages a pinion on the outer diameter of the inner tube store RO2.

The cable core SE is formed for example of a plurality of stranded leads or the like, particularly such as light waveguide fibers or leads which run through an inside bore of the tube store RO2 from the right to the left. The cable core SE can therefore either have been stranded or manufactured in a preceding processing stage or on the other hand can also be taken from a feed drum. The core SE is moved in an axial direction as indicated by the arrow by feed means for moving the cable core such as rotating wheels WH1 and WH2.

At the input side, each of the tube stores RO1 and RO2 have stationary distributor disks VT1 and VT2, respectively. These distributor disks are held adjacent their outer periphery by a standing frame which is only partially shown. The respective tube of the tube stores RO1 and RO2 places itself against the inside peripheral surface of the disks VT1 and VT2 and rotates therein. These distributor disks VT1 and VT2 thus form a bearing surface for the right hand end of each of the tube stores RO1 and RO2. Bores through these disks VT1 and VT2 are distributed over the circumference of the disk and the web threads pass through the bores and comprise a tensile material such as synthetic fibers, for example, an aromatic polyamide. The web threads supplied to the outer tube store RO1 are referenced BS1 whereas the web threads for the inner tube store RO2 are referenced BS2.

At an end of each of the tube stores RO1 and RO2 which is the output end and opposite the distributor disks VT1 and VT2, the tube stores have stranding disks VB1 and VB2. The stranding disks VB1 and VB2 are secured to their respective tube stores to rotate therewith. Accordingly, a rotatable bearing of at least the stranding disk VB1 relative to the stranding frame is provided on the outer peripheral surface. Since the tube store RO1 should be rotated relative to the tube store RO2, a bearing between the outer end face or peripheral surface of the stranding disk VB2 and the inside wall or surface of the tube RO1 is also provided in the most practical cases. The stranding disks VB1 and VB2 have openings arranged and distributed over their circumference through which the web threads BS1 for the stranding disk VB1 and BS2 for the stranding disk VB2 are conducted. Through a stranding nipple VN attached at the output of the tube store arrangement, the web threads BS1 and BS2 are brought together at about the outside diameter of the cable core SE and thereafter pressed against the core. The stranding nipple VN accordingly comprises an adequate curved throat. At the output of the stranding nipple VN, the cable core SE has been provided with a two-ply spun cover applied in an SZ method and is therefore referenced SEB.

The motors MO1 and MO2 are controlled in synchronization with one another in a conventional manner but with such a phase offset that the reversing locations of the stranding of the inner ply produced from the web threads BS2 by the tube store RO2 and those of the outer ply which are produced by the web threads BS1 by the tube store RO1 lie offset relative to one another. Preferably, the wind of the two layers or plies is antiphase or in opposite directions. In other words, the reversing points are shifted by one reversing spacing location so that the inner ply is being wound in the opposite direction to the outer ply. This measure alone, however, is not adequate in order to avoid the undoing of the reversing locations without an additional retaining helix in order to simultaneously guarantee the tensile properties of the spun cover.

In order to resolve this problem, the feed of an adhesive material KM is provided in the region of the stranding nipple. This insures that both the threads BS1 of the outer ply as well as the threads BS2 of the inner ply are still sufficiently moistened with adhesive material and unite any tensile structure in their hardened condition. When the web are applied antiphase, the moistening of the reversing region only will suffice.

In detail, the execution of the present application is undertaken such that a container KB is provided with the adhesive material KM. The adhesive material KM is preferably in the form of a hot-melt adhesive. This adhesive material KM is supplied to the stranding nipple VN via a fitting AS, wherein the inside of the stranding nipple VN contains an annularly arranged passage RG. This passage RG has one or more jet-like discharge openings AO which are distributed around the circumference and are directed in the direction toward the web threads BS1 and BS2 which are moving past at the input of the stranding nipple and which can also represent a closed gap. In this embodiment, the overall stranding nipple VN simultaneously has the properties of an injection tool whereby the adhesive material KM emerges as injected material in a region of the emission of the stranding nipple VN and moistens the web threads BS1 and BS2 moving past at this location with adhesive material. It is thereby assured that the threads of every individual ply are glued to one another and that adhesion between both the outer ply and the inner ply also occurs. In order to keep the adhesive material KM adequately fluid, it is expedient to appropriately heat the stranding nipple VN with a heating means as well as heating the supply container KB to a desired temperature for the hot-melt adhesives. This is in a range of 170° through 190° C. The threads crossing one another in the region of the stranding nipple VN are covered with the hot-melt adhesive on at least one side before they apply themselves to the cable core SE supplied from the right through the inside of the tube store RO2. When this cable core SE is a core which is unfilled or not saturated with a filling compound then a cooling and/or stripping means CS can provided immediately downstream of the stranding nipple VN. When a cable core SE, which is impregnated or saturated with a filling compound, is provided, this filling compound usually acts to provide an adequate cooling so that the additional cooling device or means can be eliminated.

Further treatment of the cable core SEB which has been provided with the spun covering can be provided downstream of the stranding nipple VN, for example, by providing additional processing means. These include means for stripping excess adhesive material from the spun covering on the cable core, means for applying an additional adhesive coating or means for applying a cladding in a standard method.

The crossing web threads BS1 and BS2 moistened with the adhesive material are bound so tightly to one another that the reversing locations can no longer unravel. In order to insure good moistening of all web threads BS1 and BS2 with adhesive material, these should be completely spread before they are applied.

The diameter of the stranding disk VB1 allocated to the outer tube store RO1 can be selected to be approximately 10 to 30% larger than the diameter of the inner tube store RO2.

Although various minor modifications may be suggested by those versed in the art, it should be understood that I wish to embody within the scope of the patent granted hereon, all such modifications as reasonably and properly come within the scope of my contribution to the art.

I claim:

1. In an apparatus for stranding web threads on a cable, said apparatus comprising two tube stores disposed concentric relative to one another, a common stranding nipple positioned at an output side of the concentrically arranged tube stores, and means for rotating each of the tube stores on their axes with a changing direction of rotation to change the direction of lay of the web threads being applied as web plies during stranding, the improvements comprising means for supplying the web threads for absorbing the longitudinal force to each of the two tube stores, feed means for applying an adhesive material to the web threads, said feed means being disposed adjacent the stranding nipple and the output side of the tube stores, and means for moving a cable core through the inner tube store of the concentrically arranged tube stores so that the cable core is provided with an adhesive-moistened spun covering formed by said web threads at an output of the stranding nipple.

2. In an apparatus according to claim 1, wherein the feed means feeds a hot-melt adhesive as the adhesive material and the feed means includes means for maintaining the hot-melt adhesive at the desired temperature.

3. In an apparatus according to claim 1, wherein the feed means for the adhesive material is positioned in a region of the stranding nipple.

4. In an apparatus according to claim 1, wherein the feed means for the adhesive material is positioned so that the web threads are contacted with the adhesive material before contact with the cable core.

5. In an apparatus according to claim 4, wherein the feed means is part of the stranding nipple.

6. In an apparatus according to claim 5, wherein the stranding nipple has a plurality of discharge openings for discharging an adhesive material on the threads as they enter the nipple, said stranding nipple having means for supplying adhesive material from a supply to said discharge openings.

7. In an apparatus according to claim 6, wherein the discharge openings are constructed in the form of jets.

8. In an apparatus according to claim 7, wherein the stranding nipple is designed as an injection tool for the output of the adhesive material.

9. In an apparatus according to claim 6, wherein the adhesive material is a hot-melt adhesive and the stranding nipple is provided with means for heating the nipple to the desired temperature range for the hot-melt adhesive.

10. In an apparatus according to claim 6, wherein the stranding nipple has a curved surface forming a throat facing the tube stores and the discharge openings are positioned on said throat.

11. In an apparatus according to claim 6, wherein the discharge openings are positioned so that the web threads run thereby.

12. In an apparatus according to claim 11, wherein the web threads are coated with an adhesive material on at least one side.

13. In an apparatus according to claim 1, wherein cooling means are provided downstream of the stranding nipple.

14. In an apparatus according to claim 1, wherein stripping means are provided downstream of the stranding nipple for removing excessive adhesive material from the spun covering.

15. In an apparatus according to claim 1, wherein the diameter of a stranding disk for the outer tube store is selected to be 10 to 30% larger than the outside diameter of the inner tube store.

16. In an apparatus according to claim 1, wherein the passage opening of the stranding nipple is selected to be of such a size and diameter that the web threads are completely spread apart.

17. In an apparatus according to claim 1, wherein the means for rotating the pair of tube stores includes a synchronous drive in a phase-shifted manner so that the reversing locations of each of the web plies do not coincide.

18. In an apparatus according to claim 1, wherein the means for rotating the pair of tube stores is synchronized with a phase shifting such that the reversing locations of the web plies coincide in an antiphase.

19. In an apparatus according to claim 1, wherein the means for moving a cable core provides a core with a filling material and the adhesive material is selected as a material which is compound-compatible and non-swellable with the filling material of the cable core.

20. In an apparatus according to claim 1, wherein the means for moving a cable core moves a cable core presaturated with a filling compound.

* * * * *